United States Patent Office 3,704,312
Patented Nov. 28, 1972

3,704,312
BIALICYCLIC AMINO ACIDS
Peter B. Russell, Villanova, Horace Fletcher III, Pottstown, and Harvey E. Alburn, West Chester, Pa., assignors to American Home Products Corporation, New York, N.Y.
No Drawing. Filed Oct. 30, 1970, Ser. No. 85,748
Int. Cl. C07c *101/04*
U.S. Cl. 260—514 R                    12 Claims

ABSTRACT OF THE DISCLOSURE

The compounds are bialicyclic amino acids which are useful as anti-inflammatory agents in warmblooded animals. The compounds are also useful, when their amino groups are properly blocked, for reacting with 6-aminopenicillanic acid, or derivatives thereof, to prepare penicillins having antibiotic activity, or as intermediates in the preparation of their corresponding N-carboxyanhydrides which may be reacted directly with 6-aminopenicillanic acid, or derivatives thereof, to prepare said penicillins.

BACKGROUND OF THE INVENTION

This invention relates generally to the production of bialicyclic amino acids and more particularly to certain aminohexahydroindanecarboxylic acids which are useful as anti-inflammatory agents in warm-blooded animals. Said amino acids are also useful, when the amino groups thereof are properly blocked, for reacting with 6-aminopenicillanic acid, or derivatives thereof, to prepare penicillins having antibiotic activity. The amino acids are additionally useful as intermediates in the preparation of their corresponding N-carboxyanhydrides. The latter, as now known in the art, may be reacted directly with 6-aminopenicillanic acid, or derivatives thereof, to prepare said penicillins having antibiotic activity.

DESCRIPTION OF THE INVENTION

We have discovered a new series of 2-aminohexahydro-2-indanecarboxylic acids which include those compounds encompassed within the following structural formula:

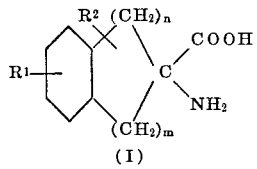

(I)

wherein $R^1$ and $R^2$ are selected from the group consisting of hydrogen, lower alkyl, lower alkoxy, phenyl and phenoxy; $n$ is an integer from 0 to 1; and $m$ is an integer from 1 to 3, with the proviso that when $n$ is 0, $m$ is always from 2 to 3.

Generally, the novel 2-amino acids (I) of the invention may be prepared by utilizing as starting materials, the corresponding hydantoins of Formula II below:

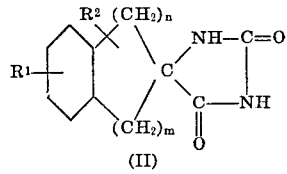

(II)

wherein $R^1$, $R^2$, $n$ and $m$ again have the same meanings described with respect to Formula I above. In said preparation of the novel compounds of Formula (I), the corresponding hydantoins of Formula II are refluxed in strong base, followed by adjusting the mixture to pH 2 with concentrated hydrochloric acid, for example, and then filtering the mixture. The filtrate may then be adjusted to pH 6 as by addition of concentrated ammonia hydroxide, at which time the aminocarboxylic acid of Formula I crystallizes from solution.

The starting material hydantoins of Formula II may be prepared by known procedures for making bialicyclic hydantoins. For example, to obtain the starting material bialicyclic hydantoins, a suitable α-hexahydroindanone or hexahydrotetralone may be heat-reacted with ammonium carbonate and potassium cyanide in an inert organic solvent. The reaction mixture may be cooled, poured into water and acidified to a low acid pH with concentrated hydrochloric acid, for example. The crude product may then be dissolved in diluted sodium hydroxide, filtered, and the filtrate re-acidified. The final pure product may then be obtained by filtering and drying.

In an alternative mode of preparation of the compounds of Formula I, the corresponding unsaturated amino-substituted indane- or tetralene- carboxylic acid may be hydrogenated in the presence of a suitable catalyst.

As referred to hereinbefore, the novel compounds of Formula I above show surprisingly show anti-inflammatory activity when administered to warm-blooded animals.

An inflammation is an abnormal condition of the tissues of some part of the body in which there is swelling, redness, heat and pain. It involves the process by which the body attempts to rid itself of bacteria, poisons, or other foreign substances which irritate or injure the tissues. The blood vessels in the affected part expand, causing more blood to flow into the irritated or injured area. The increased amount of blood in the affected part causes the redness, and the expanded blood vessels press on sensory nerves to cause the pain that may accompany an inflammation. In those instances where the presence of bacteria is involved, white blood corpuscles pass through the blood vessels into the injured or invaded area to destroy many bacteria in situ. (The accumulation of bacteria and white corpulscles occurring in an inflammation is the matter termed "pus.")

It is well known that agents which are effective against inflammations are active also in preventing both the clinical and histopathologic changes which occur in experimentally induced granuloma in test animals. Such agents include the compounds prednisolone and phenylbutazone, each of which has been shown to be active against inflammations in test animals. Thus, experimentally induced inflammations in test animals may serve as a test standard for anti-inflammatory activity in general.

An experimentally induced inflammation found to be valuable for comparing the anti-inflammatory activity of a compound to be tested, with that of the aforesaid standard compound, may be caused by the insertion of cotton pellets into bilaterally adrenalectomized test animals in accordance with the procedure described by C. A. Winter et al. in Federation Proceedings, March-April 1963, vol. 22, No. 2, Part I., and followed in Test Method A below:

Test Method A

Pursuant to the test procedure of C. A. Winter et al. referred to above, male Wistar rats, weighing 150± grams are bilaterally adrenalectomized. The adrenalectomized rats are anesthetized and two cotton pellets are inserted subcutaneously in each animal. The cotton pellets are preferably Johnson and Johnson Dental Rolls (1), having weight ranges of 38±1; 40±1; 41±1; 42±1; 43±1; and 44±1 mg. The animals are then provided with 1% saline solution containing 0.01% glucose, and a standard stock diet, and the room temperature maintained at 78°–80° F. Beginning on the same day of the insertion of the cotton pellets, treatment is instituted by oral administration of 1.5 and 3.0 mg. of selected test compounds in aqueous solution of carboxymethyl cellulose (0.5%) with respect to half the rats. The treatment is administered twice daily for five consecutive days for a total of ten doses.

All the rats (both those treated and the control group) are autopsied on the seventh day and the granulomas (cotton pellets) are removed. The pellets are dried for 72 hours at 80° C. and then maintained for 24 hours at room temperature. The pellets are then weighed individually to the nearest 0.1 mg.

The anti-inflammatory activity of the test compounds may then be expressed as percent inhibition, which is determined with the use of the following formula:

Percent Inhibition
$$= 100 \times \frac{\text{Av. pellet wt. increase for control minus av. pellet wt. increase for treated}}{\text{Av. pellet wt. increase for control}}$$

The statistical significance and percent relative potency of the test compound is then compared with that of the reference standard used.

It is also well known that agents which are effective against inflammations are active also in preventing both the clinical and histopathologic changes which occur in experimentally-induced edema in test animals. In addition to phenylbutazone, which is also useful in Test Method A supra, other standard compounds for the edema test are aspirin, hydrocortisone, indomethacin, flufenamic and mefanamic acid. Experimentally-induced edema valuable for comparing the anti-inflammatory activity of a compound to be tested, with that of one of the aforesaid standard compounds, follows the procedures suggested by C. A. Winter et al. in Proc. Soc. Exp. by Biol. and Med. 111:544, 1962 and by Buttle et al. in Nature 179:629, 1957, as described in Test Method B below:

Test Method B

Male Sprague-Dawley rats weighting 120–160 grams are utilized. The compound to be tested is administered orally as a solution or suspension in distilled water (plus 2 drops of Tween 80) in a volume of 10 ml./kg. Each compound under test is given to six rats and the vehicle alone is administered to six more rats as a control. Sixty minutes after drug administration, edema is induced by an injection of 0.05 ml. of 1 percent carrageenin in saline into the subplantar tissue of each rat's right hind paw. Paw volume is then immediately measured volumetrically with a plethysmograph and again three hours later. The mean volume of swelling for the control group is calculated and compared with that of the test groups. Compounds that inhibit swelling by 23 percent as compared to the controls are considered active. Inhibition is calculated by the following formula:

Percent Inhibition
$$= \frac{\text{Mean vol. swelling of control} - \text{mean vol. swelling of test}}{\text{Mean vol. swelling of control}} \times 100$$

The statistical significance of the compounds may then be compared with that of the reference standard which is selected from the group of compounds referred to previously.

In the use of the compounds of Formula I as anti-inflammatory agents, they may be administered alone or in combination with pharmaceutically acceptable carriers, and the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is, intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

Compounds of Formula I have shown a 40% inhibition at an oral dose of 60 mg./kg. when tested in accordance with Test Method A, and a 36% inhibition at an oral dose of 100 mg./kg. when tested in accordance with Test Method B.

The surprising efficacy of the compounds of Formula I above in the treatment of inflammations in accordance with the foregoing test procedures has clearly indicated that they are extremely active, relatively non-toxic, long-acting anti-inflammatory agents.

The following examples are illustrative of the preparation of compounds having the aforesaid anti-inflammatory activity, but are not to be considered necessarily limitative thereof:

EXAMPLE 1

2-amino-2-indancarboxylic acid 17.7 g., 0.1 mole, is dissolved in 150 ml. of 0.7 N hydrochloric acid and 2 gms. of 5% rhodium on charcoal catalyst is added. The mixture is hydrogenated on a shaker at 50 p.s.i. of hydrogen at 50° C. for 24 hours, cooled and filtered to remove catalyst. The filtrate is adjusted to pH 5.5 with dilute aqueous base and chilled. The product is filtered and dried. Yield: 12 g., 68%, M.P. 315°.

Analysis.—Calc. for $C_{10}H_{17}NO_2$ (percent): N, 7–64. Found (percent): N, 7–68.

EXAMPLE 2

Utilizing the procedure of Example 1 and the starting materials given in Table I below, the corresponding anti-inflammatory amino acids of Formula I also given in said table, are obtained:

TABLE I

| Starting amino acid | Final amino acid |
| --- | --- |
| 1-amino-5-butyl indane carboxylic acid. | 1-amino-5-butyl-α-hexahydro-indane carboxylic acid. |
| 1-amino-5-butoxy-tetralene carboxylic acid. | 1-amino-5-butoxy-hexahydro-tetralene carboxylic acid. |
| 1-amino-4-phenyl-indane carboxylic acid. | 1-amino-4-phenyl-α-hexahydro-indane carboxylic acid. |
| 1-amino-6-methyl-tetralene carboxylic acid. | 1-amino-6-methyl-hexahydro-tetralene carboxylic acid. |
| 2-amino-5-methyl-2-indane-2-carboxylic acid. | 2-amino-5-methyl-2-hexahydro-indane-2-carboxylic acid. |
| 2-amino-4-ethoxy-2-indane 2-carboxylic acid. | 2-amino-4-ethoxy-2-hexahydro-indane-2-carboxylic acid. |
| 2-amino-6-methoxy-tetralene carboxylic acid. | 2-amino-6-methoxy-hexahydro-tetralene carboxylic acid. |
| 2-amino-4-phenoxy-2-indane-2-carboxylic acid. | 2-amino-4-phenoxy-2-hexahydro-indane-2-carboxylic acid. |

We claim:
1. An amino carboxylic acid of the formula:

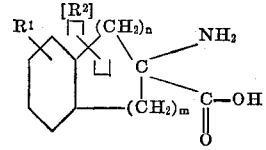

wherein $R^1$ is selected from the group consisting of hydrogen, lower alkyl, lower alkoxy, phenyl and phenyloxy; $n$ is an integer from 0 to 1; and $m$ is an integer from 1 to 2, with the provisos that when $n$ is 0, $m$ is always 2, and when $n$ is 1, $m$ is always 1.

2. An amino carboxylic acid as defined in claim 1, which is: 1-aminohexahydroindanecarboxylic acid.

3. An amino carboxylic acid as defined in claim 1, which is: 2-aminohexahydroindane-2-carboxylic acid.

4. 1-amino-6-methoxyhexahydrotetralenecarboxylic acid.
5. 1-amino-5-butyl-α-hexahydroindane carboxylic acid.
6. 1-amino-5-butoxy-hexahydrotetralene carboxylic acid.
7. 1-amino-4-phenyl-α-hexahydroindane carboxylic acid.
8. 1-amino-6-phenoxy-hexahydrotetralene carboxylic acid.
9. 2-amino-5-methyl-2-hexahydroindane-2-carboxylic acid.
10. 2-amino-4-ethoxy-2-hexahydroindane-2-carboxylic acid.
11. 2-amino-6-methoxy-hexahydrotetralene carboxylic acid.
12. 2-amino-4-phenoxy-2-hexahydroindane-2-carboxylic acid.

References Cited

Chisolm et al., Tet. Lett. 15, 1372 (1967).

LORRAINE A. WEINBERGER, Primary Examiner

R. GERSTL, Assistant Examiner

U.S. Cl. X.R.

260—239.1, 307 B, 309.5, 518 R, 519; 424—319